(12) United States Patent
Cole et al.

(10) Patent No.: US 10,113,663 B1
(45) Date of Patent: Oct. 30, 2018

(54) WATER METER LOCKING DEVICE

(71) Applicant: Foster Supply, Inc., Scott Depot, WV (US)

(72) Inventors: Kerry D Cole, Scott Depot, WV (US); Thomas G Hodges, Hurricane, WV (US)

(*) Notice: Subject to any disclaimer, the term of this patent is extended or adjusted under 35 U.S.C. 154(b) by 0 days.

(21) Appl. No.: 15/854,995

(22) Filed: Dec. 27, 2017

Related U.S. Application Data

(60) Provisional application No. 62/548,451, filed on Aug. 22, 2017.

(51) Int. Cl.
    *F16K 35/06* (2006.01)

(52) U.S. Cl.
    CPC .................... *F16K 35/06* (2013.01)

(58) Field of Classification Search
    CPC ........... F16K 35/00; F16K 35/06; F16K 35/10
    USPC ... 70/14, 18, 19, 54–56, 175–180, 202, 203, 70/211, 212, 229–232, DIG. 57; 137/382, 137/383, 384, 385, 384.8; 251/89
    See application file for complete search history.

(56) References Cited

U.S. PATENT DOCUMENTS

| | | | |
|---|---|---|---|
| 595,886 A | 12/1897 | Mullen | |
| 1,484,793 A | 2/1924 | Moore | |
| 1,530,814 A * | 3/1925 | Credle | F16K 35/10 70/178 |
| 1,690,461 A | 11/1928 | Sieben | |
| 2,377,036 A * | 5/1945 | Quarfoot | F16K 35/10 70/178 |
| 3,756,450 A * | 9/1973 | Crose, Jr. | F17C 13/06 137/382 |
| 4,033,372 A * | 7/1977 | Bowman | E03B 9/06 137/296 |
| 4,208,893 A | 6/1980 | Avrich et al. | |
| 4,327,766 A * | 5/1982 | Burke | F02N 19/001 123/179.8 |
| 4,577,655 A * | 3/1986 | Carroll | F16K 49/00 137/375 |
| 4,600,033 A * | 7/1986 | Baron | F17C 13/002 137/382 |
| 4,662,196 A * | 5/1987 | Michon | F16K 35/06 70/177 |
| 4,817,663 A * | 4/1989 | McAndrew | F16K 5/0647 137/385 |
| 5,058,758 A * | 10/1991 | Suddeth | F16K 35/10 137/382 |
| 6,354,116 B1 | 3/2002 | Drake | |
| 6,843,083 B2 | 1/2005 | Smith et al. | |

(Continued)

*Primary Examiner* — Lloyd A Gall
(74) *Attorney, Agent, or Firm* — Dinsmore & Shohl LLP; Monika L'Orsa Jaensson, Esq.

(57) ABSTRACT

A valve lock assembly useful in securing access to the valves of a valve system, including a housing defined by a top and a skirt, the skirt extending down from the top forming a vacuous area within the housing. The housing has a structure, such as a dual-sided corner brace, affixed to the housing top, providing a space with limited accessibility. Removably engaged with the housing is a lock assembly, including a coil rod positioned to be received in the aligned apertures of the housing top and the brace top, and further supports a plurality of dowel pins. The lock assembly may have a plurality of lock bars, affixed a plate of the lock assembly, and having a plurality of dowel pins rotatably affixed to the lock bars.

19 Claims, 6 Drawing Sheets

(56) References Cited

U.S. PATENT DOCUMENTS

| | | | |
|---|---|---|---|
| 7,448,402 B2 * | 11/2008 | Martrich | F17C 13/123 137/15.11 |
| 8,955,540 B2 | 2/2015 | Agbay et al. | |
| 2006/0042694 A1 | 3/2006 | Reineck | |
| 2010/0319416 A1 | 12/2010 | Eller, Jr. | |

* cited by examiner

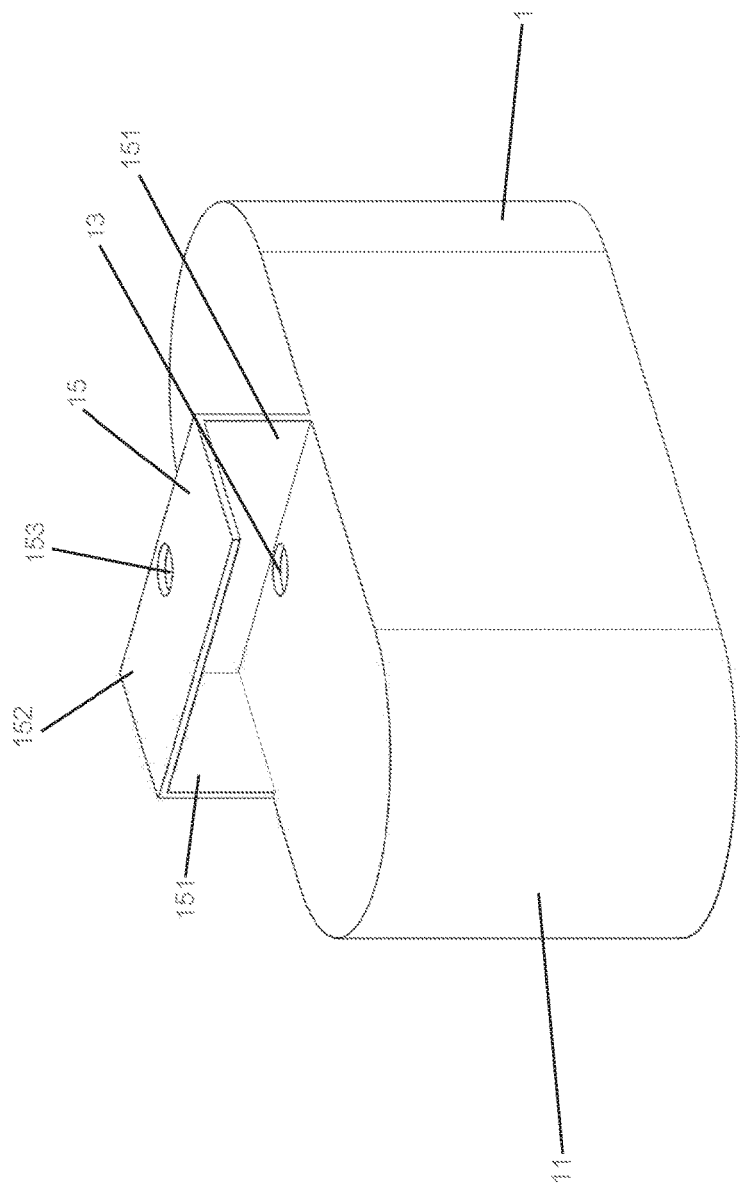

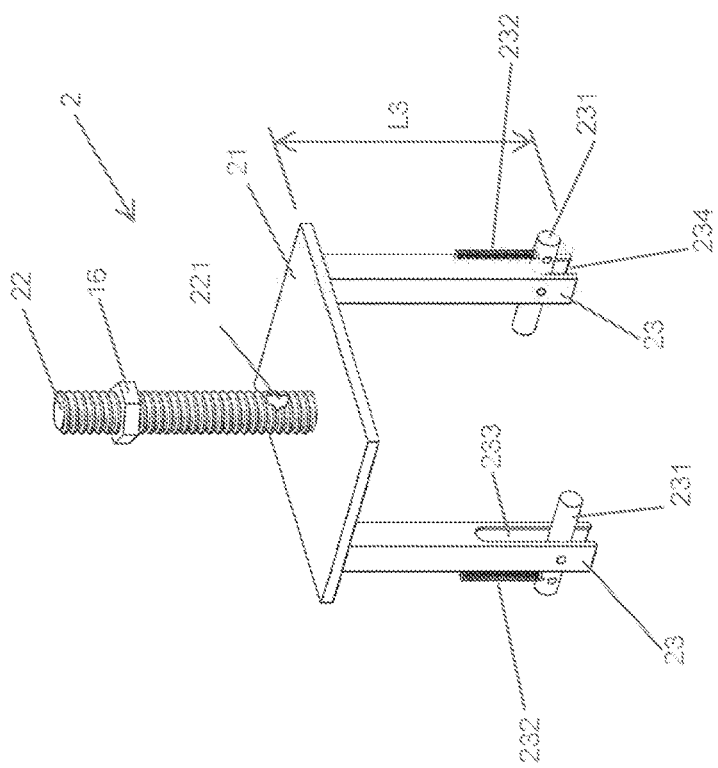

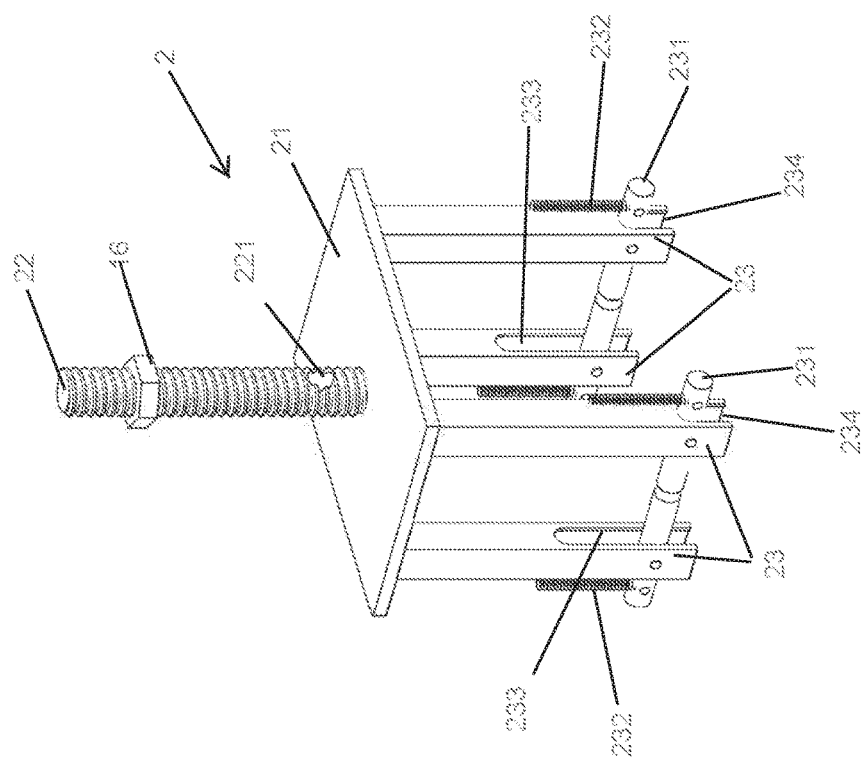

WATER METER LOCKING DEVICE

BACKGROUND

The disclosed technology regards a valve lock assembly useful in securing access to the valves of a valve system.

Presently, utility providers and others control the flow of gas, water and other liquids, by means of a valve system, wherein the position of the valve determines whether a liquid flows through the line. It is desirable in many instances to limit access to this valve system, allowing the owner or its authorized personnel to adjust the position of the valves in accordance with the needs and requirements of the provider and user. Often, the valve system is located in a metered housing. To date, there has not been a well-developed system which effectively restricts access to valves, including incidental adjustment as well as theft of liquids.

Therefore, there is a need for a valve lock assembly useful in securing access to the valves of a valve system, that is both easy to install and effective in securing access to the system.

GENERAL DESCRIPTION

The disclosed technology regards a valve lock assembly useful in securing access to the valves of a valve system, which is both easy to install and effective in securing access to the valve system. The valve lock assembly includes a housing and a removable lock assembly. The housing is defined by a top and a skirt, the skirt extending down from the top forming a vacuous area within the housing. The housing includes a dual-sided corner brace affixed to the housing top. This corner brace is defined by a pair of adjacent side walls and a top, to form a space with limited accessibility.

The removable lock assembly includes a coil rod extending from its top surface, and supports in a rotational configuration a plurality of dowel pins. Aligned apertures are position in the housing top and the brace top to receive the coil rod of the removable lock assembly, and facilitate affixation thereof about the valves, lines and meter of a valve system.

The disclosed technology also regards a valve lock assembly having a housing with a top surface and an aperture extending therethrough, coupled with a removable lock assembly. The removable lock assembly includes a lock plate with a coil rod positioned to be received in the aperture of the housing top, at least two lock bars affixed to the opposing side of the lock plate, and a plurality of dowel pins, each dowel pin rotatably fixed to a distal end of each lock bar. A structure is affixed to the top of the housing, having an aperture aligned with the aperture of the housing to receive the coil rod of the removable lock assembly, the structure providing a space with limited access to receive a locking mechanism through an aperture of the coil rod.

The lock assembly of the disclosed technology is designed and configured to be received in the housing, with the coil rod extending through the aperture of the housing. This configuration can be secured by means of a nut or similar fastening means, secured for example at the top portion of the coil rod. When installed on a valve assembly, the lock assembly may be secured to the housing and then secured about the valves, lines and meter of the valve assembly (with the dowel pins rotating about the lock bars to allow the dowel pins to assume a locked position below the valves and/or lines of the valve assembly), or may be independently engaged with the valves (by rotation of the dowel pins), with the housing thereafter secured atop the lock assembly. A shackle of a padlock may then be passed through an aperture of the coil rod, and the padlock is locked in place. In this configuration, the padlock must be unlocked, and the shackle removed from the aperture, in order for the housing to be removable from the lock assembly, exposing the lock assembly and allowing a user to disengage the lock assembly from the valves and lines of the valve system.

DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4 is a perspective view of another embodiment of the housing of the disclosed technology;

FIG. 5 is a perspective view of an embodiment of the lock assembly of the disclosed technology; and FIG. 6 is a perspective view of another embodiment of the lock assembly of the disclosed technology.

DETAILED DESCRIPTION

Figure 1:
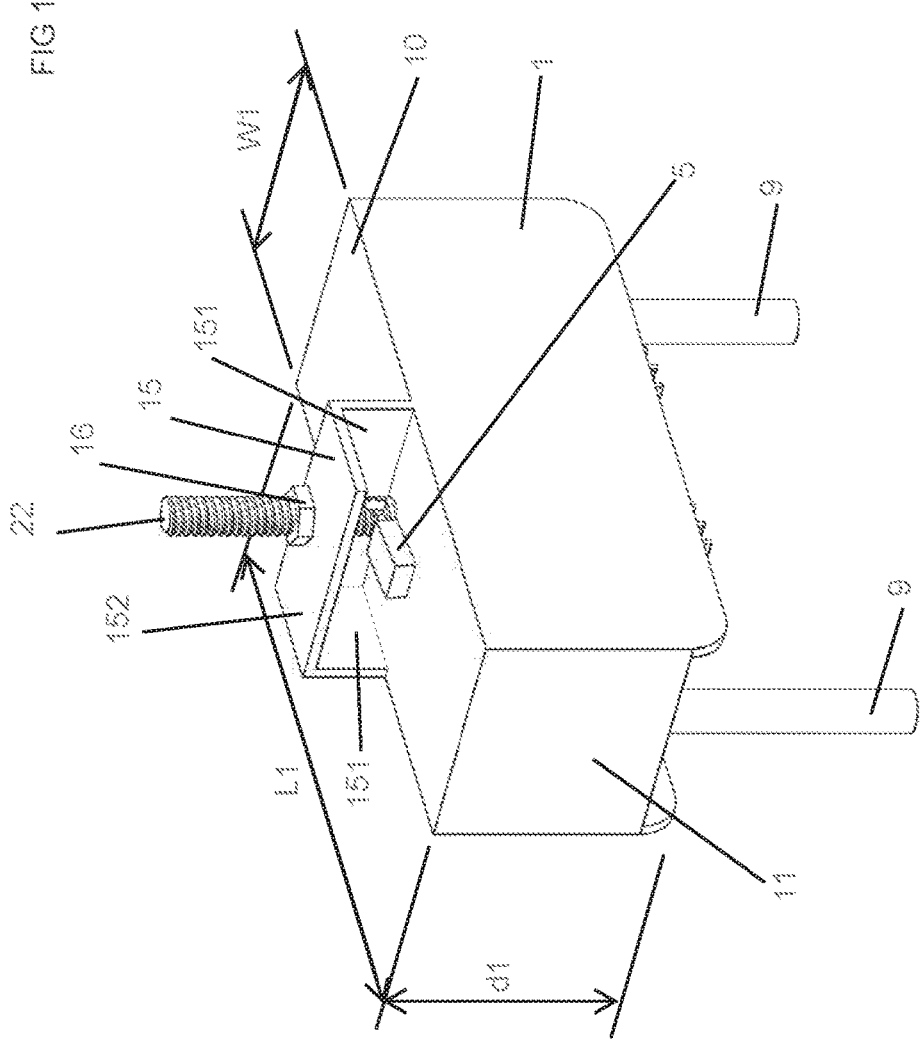
FIG. 1 is a perspective view of an embodiment of the valve lock assembly of the disclosed technology, installed at a meter location of a valve system.
Figure 2:
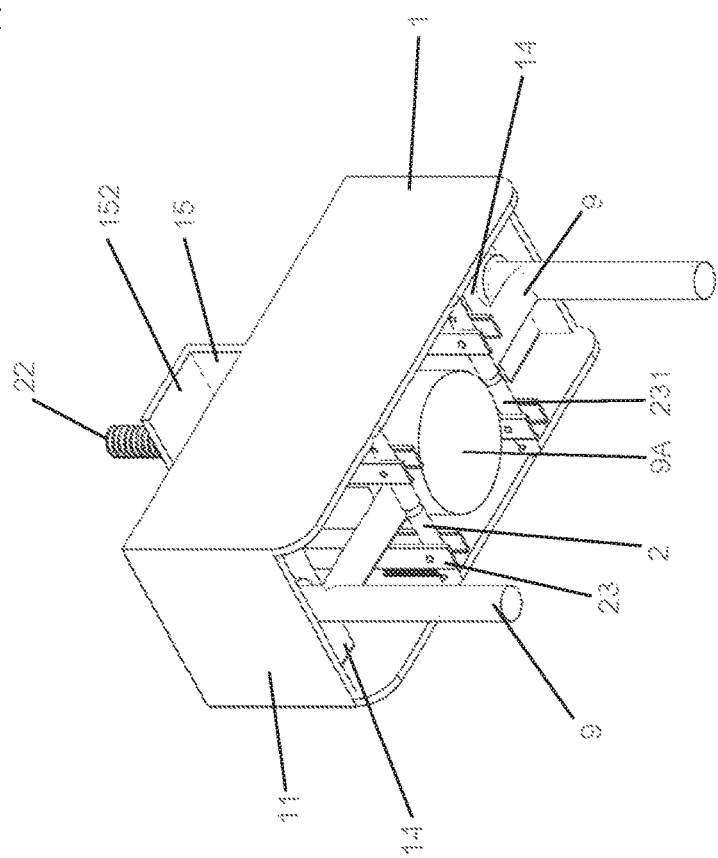
FIG. 2 is a perspective view from the bottom of the embodiment of FIG. 1.

The disclosed technology is a valve lock assembly useful in securing access to the valves of a valve system. As shown in the embodiments of FIGS. 1 and 2, the technology includes a housing 1 and a removable lock assembly 2 supporting a coil rod 22 and a plurality of dowel pins 231. When installed on a valve system, the dowel pins secure the lock assembly and the housing to the valve system, inhibiting access to the valves.

Figure 3:
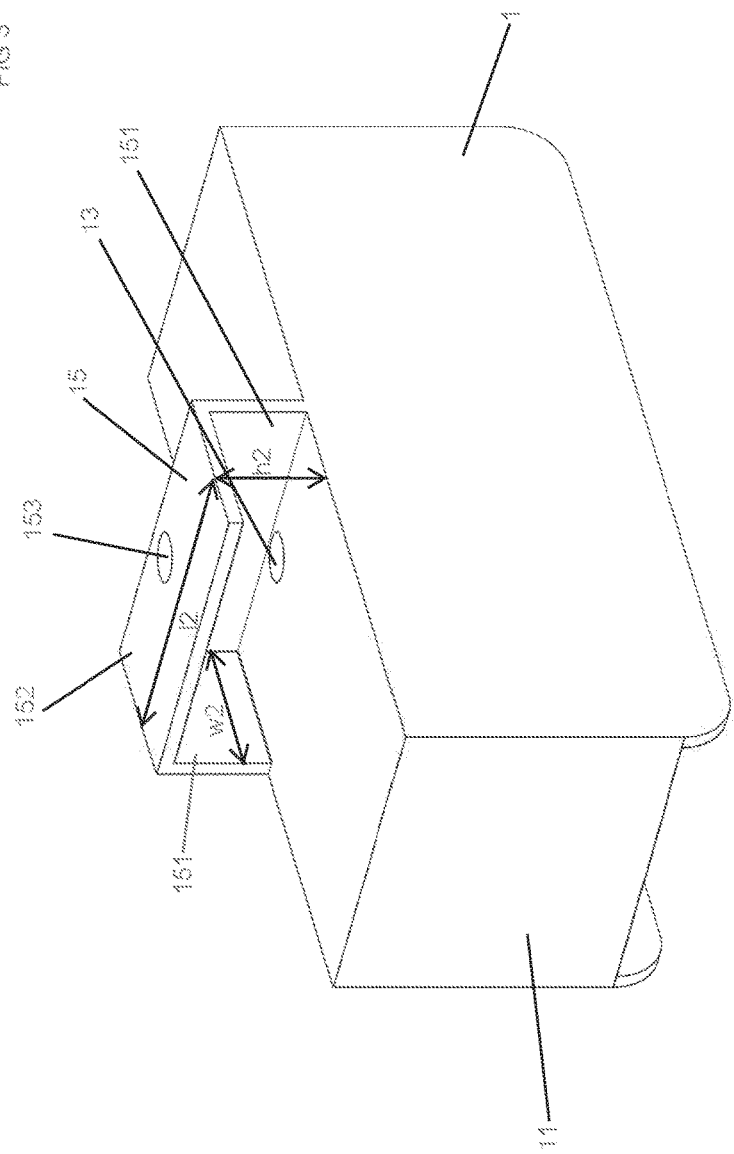
FIG. 3 is a perspective view of an embodiment of the housing of the disclosed technology.

As depicted in FIGS. 1-4, the housing 1 of the assembly of the disclosed technology is defined by a top 10 and a skirt 11, extending down from the top, forming a vacuous area within the housing suitable for receiving a meter 9A of the valve system. The housing top has an aperture 13 to receive the coil rod of the locking assembly. As shown in FIG. 1-3, the skirt may comprise a pair of end walls and a pair of side walls, or alternatively the skirt may be a solid wall extending downward about or near the perimeter of the top as shown in FIG. 4. As depicted in these figures, embodiments of the housing may have a rectangular or oblong shape.

A structure is affixed to the top of the housing, providing a space with limited access to receive a locking mechanism through an aperture extending latitudinally through the coil rod. For example, the structure may be sized and configured to receive and substantially cover at least the shackle of a padlock, while providing access to the locking mechanism of the padlock when the padlock is secured to the assembly. If the structure includes a top, the top may have an aperture 153 aligned with the aperture 13 of the housing to receive the coil rod. Acknowledging that padlocks are available in a wide range of sizes, the limited space for receiving the padlock formed by this structure is dependent on the size of the intended padlock (or other locking mechanism).

As shown in FIGS. 1-4, the structure may be a dual-sided corner brace 15, affixed to the top of the housing, near its center. In the embodiment shown, the corner brace is defined by a pair of adjacent side walls 151 and a top 152, to form a space sufficient to at least partially house a padlock, but limit accessibility to the shackles thereof. The position of the aperture 153 for receiving the coil rod is also incorporated into the design for purposes of positioning the padlock when the shackle thereof is inserted into the latitudinally extending aperture in the coil rod, and should be considered when designing the structure, based upon the size and configuration of the intended padlock. In an exemplary embodiment, the corner brace has a height h2 of between about 1-3", a length l2 of between about 4-12", and a width w2 of between about 2-5". In the embodiments shown in the figures, the corner brace is shown to extend the entire width of the housing; however, the corner brace may extend over only a portion of the width of the housing, positioned to receive the coil rod of the lock assembly, and of sufficient and limited width and height to accommodate and limit access to the locking mechanism.

As shown in FIG. 2, mid-plates 14 may be affixed to the interior of each of the housing end walls and a corresponding portion of the side walls, or near or at the ends of the housing as defined by the skirt. The mid-plates are longitudinally positioned within the housing so that when the valve lock assembly of the disclosed technology is positioned over and about a valve system, the mid-plates rest on top of the valves or lines/piping 9 of the valve system, leaving sufficient room about a meter (if any) 9A so that the dowel pins of the disclosed lock assembly can extend below the valves or piping of the valve system, when the valve lock assembly is positioned over the valve system. In some embodiments, where the valve system comprises piping elbows near the valves, the mid-plates may be installed along the depth of the housing; in embodiments where the valve system does not include elbows, and the valves and associated piping extends from the valves, the mid-plates may be positioned at the bottom of the housing.

As shown in FIGS. 5 and 6, the lock assembly 2 includes a lock plate 21 sized to fit within the vacuous area of the housing (wherein the vacuous area may be made smaller by any mid-plates). A coil rod 22 is affixed to or engaged in an aperture with the lock plate, extending from the top of the lock plate. The coil rod 22 is positioned on the lock plate 21 so that when the lock assembly is received within the vacuous area of the housing, the coil rod extends through the apertures 13,153 of the housing top, and any aperture aligned therewith of a structure for the locking mechanism. An aperture 221 traverses latitudinally through the coil rod, sized to receive a shackle of a padlock 5 or other locking mechanism, the aperture being positioned on the coil rod so that when the lock plate is received within the housing, the coil rod is received within the aperture of the housing, and the valve lock assembly of the disclosed technology is engaged about a valve system as herein described, the coil rod aperture is positioned above the top wall of the housing, and within the limited access space of any structure. Multiple apertures may be positioned along the length of the coil rod to accommodate different valve systems with the valve lock assembly of the disclosed technology.

Fastening means (e.g., a threaded nut) 16 may be used to secure the lock assembly to the housing, when the distal end of the coil rod is threaded and extends through the apertures of the housing top wall and support providing limited access to the padlock, if any. By the length of the coil rod and engagement of this fastening means, the lock assembly may be positioned about the valve assembly, and once in place, the fastening means may be tightened against the housing top (or the structure providing limited access to the padlock), moving the plate of the lock assembly towards the housing until the dowel pins of the valve lock assembly are secure against the valves and/or piping of the valve system.

In the embodiments shown, two or four lock bars 23 are affixed to the underside of the lock plate, forming a vacuous area in the lock assembly suitable for receiving a meter of the valve system. Each lock bar may be configured as a plate, or as a solid or hollow bar having a rectangular or circular cross section. In the embodiment depicted in FIG. 5, with two lock bars extending from the lock plate, the lock bars are positioned at diagonally opposing corners of the lock plate. In the embodiment depicted in FIG. 6, with four lock bars, the lock bars are positioned at the corners of the lock plate. The lock bars have a length l3, between about 3-18", thereby providing a vacuous area to receive a meter of a valve system, and when the lock assembly and the housing are tightened in position about a valve system, the lock bars extend below the position of any mid-plates a distance to allow the mid-plates to sit atop the valves or lines/piping, while the dowel pins of the lock assembly are secured below the valves or lines/piping.

A dowel pin 231 is rotatably affixed to the distal end of each lock bar 23, wherein the rotation of the dowel pin is provided, for example, by means of a pin extending through opposing sides of the lock bar, through an aperture traversing latitudinally through the dowel pin, as shown in FIGS. 5 and 6. The dowel pins may have a length so that their distal end extends into the space between the lock bars; when two lock bars are used, this length may be longer than in the four lock bar configuration. Importantly, the dowel pins should not be so short as to allow the assembly, even when assembled and secured within the metered housing, to be maneuvered around the valves or lines/piping. Furthermore, the dowel pins should not be so long as to inhibit the pins from springing into their locked position after the lock assembly passes over the valves or lines/piping (as herein described).

As shown in the embodiments of FIGS. 5 and 6, each of the lock bars has an elongated slot 233 on an interior side of a distal end of the bar, and an abbreviated slot 234 on an opposing exterior side of the distal end of the bar, the slots designed and configured to facilitate and restrict rotation of the dowel pin relative to the lock bars. In the embodiments shown, the elongated slot has a length sufficient to receive at least a portion of the dowel pin rotating into the slot when the dowel pin rotates within the vacuous area of the housing, in the direction of the elongated slot, and the abbreviated slot has a length of about the depth of the portion of the dowel pin secured within the distal end of the lock bar, to receive the dowel pin in its locked position, and restrict further rotation thereof about the lock bar. Other means to facilitate and limit the rotation of the dowel pin may be provided.

In the embodiments shown in FIGS. 5 and 6, the dowel pin is spring loaded, for example by springs 232 affixed at one end to the exterior side of the lock bar (the side comprising the abbreviated slot), and at the other end to the proximal end of the dowel pin. By this spring loaded configuration, the dowel pin is compelled into its locked position, perpendicular with the lock bar, unless a force is exerted on the distal end of the dowel pin, causing limited rotation of the dowel pin at least partially into the elongated slot. This force may be applied manually, or by moving the lock assembly over the valves, the valves or lines/piping pushing against the distal ends of the dowel pins as the assembly is set into the meter assembly, rotating the pins into the vacuous area of the housing. Once the force is removed (either manually, or when the valves or lines/piping have passed beyond the distal tip of the dowel pins), the springs cause the dowel pins to return to their locked position, perpendicular to the lock bar.

The lock assembly 2 is designed and configured to be received in the housing 1, with the coil rod of the top plate of the lock assembly received within the aperture(s) of the housing. This configuration can be secured in a loose position, by means of a nut or similar fastening means, secured at the top portion of the coil rod. When installed on a valve assembly, the lock assembly may be first engaged with the housing and then secured about the valves of the valve assembly (with the dowel pins rotating about the lock bars to allow engagement thereof below the valves or adjacent piping of the valve assembly), or may be independently engaged with the valves (by rotation of the dowel pins), with the housing thereafter loosely secured atop the lock assembly. FIGS. 1 and 2 depict the valve lock assembly of the disclosed technology, installed on a valve assembly controlling flow through a plurality of pipes 9 and a meter 9A. Once the assembly is secured about the valves/pipes, the nut or other fastening means are tightened, causing the plate of the lock assembly to move towards the housing, until the installation is tight; thereafter, the shackle of a padlock 5 is passed through the aperture of the coil rod, and the padlock is locked in place. In this configuration, the padlock must be unlocked, and the shackle removed from the aperture, in order for the housing to be removable and expose the valves of the valve system.

The housing of the disclosed technology may be sized and configured to be received in a metered housing. For example, many metered housings have a diameter of 15" or 18", and for use with these metered housings the length l1 of the housing of the disclosed technology will be less than 15" or 18", respectively. Importantly, the housing and the lock assembly are designed so that they can be received in a meter housing (if any), accommodating any meter of the valve system in a vacuous area of the removable lock assembly. Furthermore, the lock assembly is designed so that when engaged with the valve system, the distal end of its dowel pins are positioned to secure below opposing valves or lines of the valve system. In certain exemplary embodiments, the housing 1 is designed to have a width w1 between about 4-12", a length l1 between about 12-36" and a depth d1 between about 3-18".

While particular embodiments have been illustrated and described herein, it should be understood that various other changes and modifications may be made without departing from the, spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A valve lock assembly useful in securing access to the valves of a valve system, the valve lock assembly comprising
   a) a housing defined by a top and a skirt, the skirt extending down from the top forming a vacuous area within the housing, the housing having a dual-sided corner brace affixed to the housing top, wherein the corner brace is defined by a pair of adjacent side walls and a top, to form a space with limited accessibility, and wherein the housing top and the brace top have aligned apertures; and
   b) a removable lock assembly, wherein the removable lock assembly comprises a coil rod positioned to be received in the aligned apertures of the housing top and the brace top, and further rotationally supports a plurality of dowel pins.

2. The valve lock assembly of claim 1, wherein the skirt comprises a solid wall extending downward about the perimeter of the housing top.

3. The valve lock assembly of claim 1, wherein the housing further comprises mid-plates affixed to the interior of the housing skirt, at their longitudinal ends.

4. The valve lock assembly of claim 1, wherein the removable lock assembly comprises a lock plate supporting the coil rod, the lock plate being sized to fit within the vacuous area of the housing.

5. The valve lock assembly of claim 4, wherein an aperture traverses latitudinally through the coil rod, sized to receive a shackle of a padlock, the aperture being positioned so that when the lock plate is received within the vacuous area of the housing, and the coil rod is received within the aligned apertures of the housing top and the brace top, the coil rod aperture may be positioned within the space created by the corner brace.

6. The valve lock assembly of claim 4, wherein the removable lock assembly comprises at least two lock bars affixed to the lock plate, and wherein each of the dowel pins is rotatably fixed to the distal end of the lock bars.

7. The valve lock assembly of claim 5, wherein the removable lock assembly comprises four lock bars affixed at corners of the lock plate, and wherein each of the dowel pins is rotatably fixed to the distal end of the lock bars.

8. The valve lock assembly of claim 7, wherein each of the lock bars has an elongated slot on an interior side of a distal end of the bar, and an abbreviated slot on an opposing exterior side of the distal end of the bar, the slots designed and configured to facilitate and restrict rotation of the dowel pin relative to the lock bar.

9. The valve lock assembly of claim 8, wherein the elongated slot has a length at least as long as the distal end of the dowel pin, and the abbreviated slot has a length of about the depth of the portion of the dowel pin secured within the distal end of the lock bar.

10. The valve assembly of claim 7, wherein the dowel pins are spring loaded to allow and facilitate rotation of the dowel pin relative to the lock bar.

11. The valve assembly of claim 7, wherein the lock assembly comprises a plurality of springs, each spring affixed at one end to one of the lock bars, and at the other end to the proximal end of the dowel pin rotatably secured to the lock bar.

12. The valve lock assembly of claim 1, further comprising a fastener for engagement with the coil rod, to secure the lock assembly to the housing when the distal end of the coil rod extends through the aligned apertures of the housing top and the brace.

13. A valve lock assembly useful in securing access to the valves of a valve system, the valve lock assembly comprising
   a) a housing having an aperture extending through a top surface of the housing; and
   b) a removable lock assembly, wherein the removable lock assembly comprises:
     i) a lock plate;
     ii) at least two lock bars affixed to the lock plate, iii) a plurality of dowel pins, each dowel pin rotatably fixed to a distal end of each lock bar, and iv) a coil rod extending from the lock plate, and positioned to be received in the aperture of the housing.

14. The valve lock assembly of claim 13, wherein the removable lock assembly comprises four lock bars affixed at corners of the lock plate.

15. The valve lock assembly of claim 13, wherein each of the lock bars has an elongated slot on an interior side of a distal end of the bar, and an abbreviated slot on an opposing exterior side of the distal end of the bar, the slots designed and configured to facilitate and restrict rotation of the dowel pin relative to the lock bar.

16. The valve lock assembly of claim 15, wherein the elongated slot has a length at least as long as the distal end of the dowel pin, and the abbreviated slot has a length of about the depth of the portion of the dowel pin secured within the distal end of the lock bar.

17. The valve assembly of claim 15, wherein the lock assembly comprises a plurality of springs, each spring affixed at one end to one of the lock bars, and at the other end to the proximal end of the dowel pin.

18. The valve lock assembly of claim 13, further comprising a fastener for engagement with the coil rod, to secure the lock assembly to the housing when the distal end of the coil rod extends through the aperture of the housing.

19. The valve lock assembly of claim 13, wherein the housing further comprises a structure to receive and provide limited access to a padlock, the padlock being securable through an aperture of the coil rod.

* * * * *